April 7, 1970
J. J. FRY
CONTROL UNITS MORE PARTICULARLY FOR THE ELECTRICAL CIRCUITS OF VALVE ACTUATORS
Filed Oct. 25, 1967
3,504,555
3 Sheets-Sheet 1
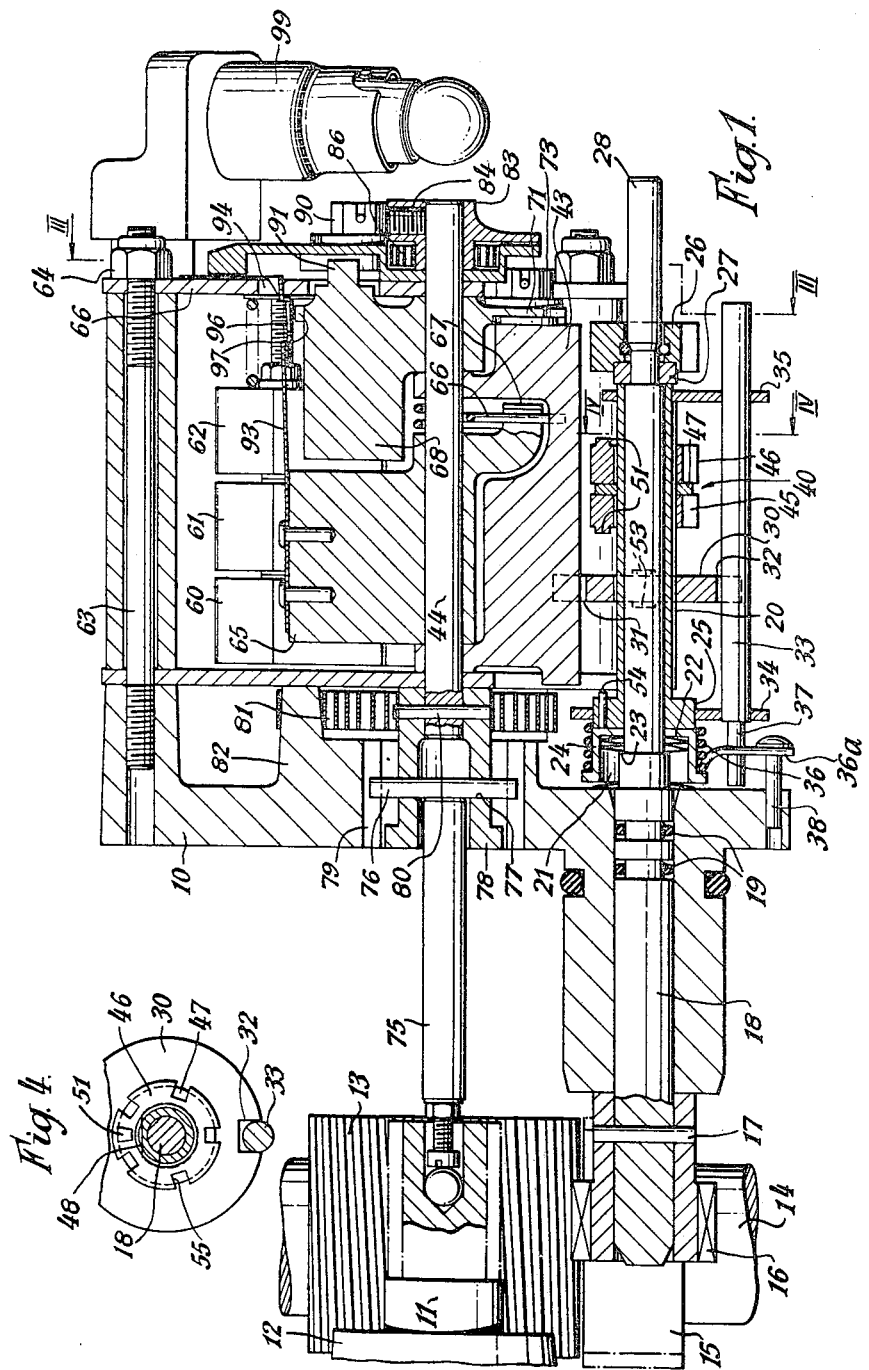
INVENTOR
JEREMY J. FRY
By Stevens, Davis, Miller & Mosher
ATTORNEYS

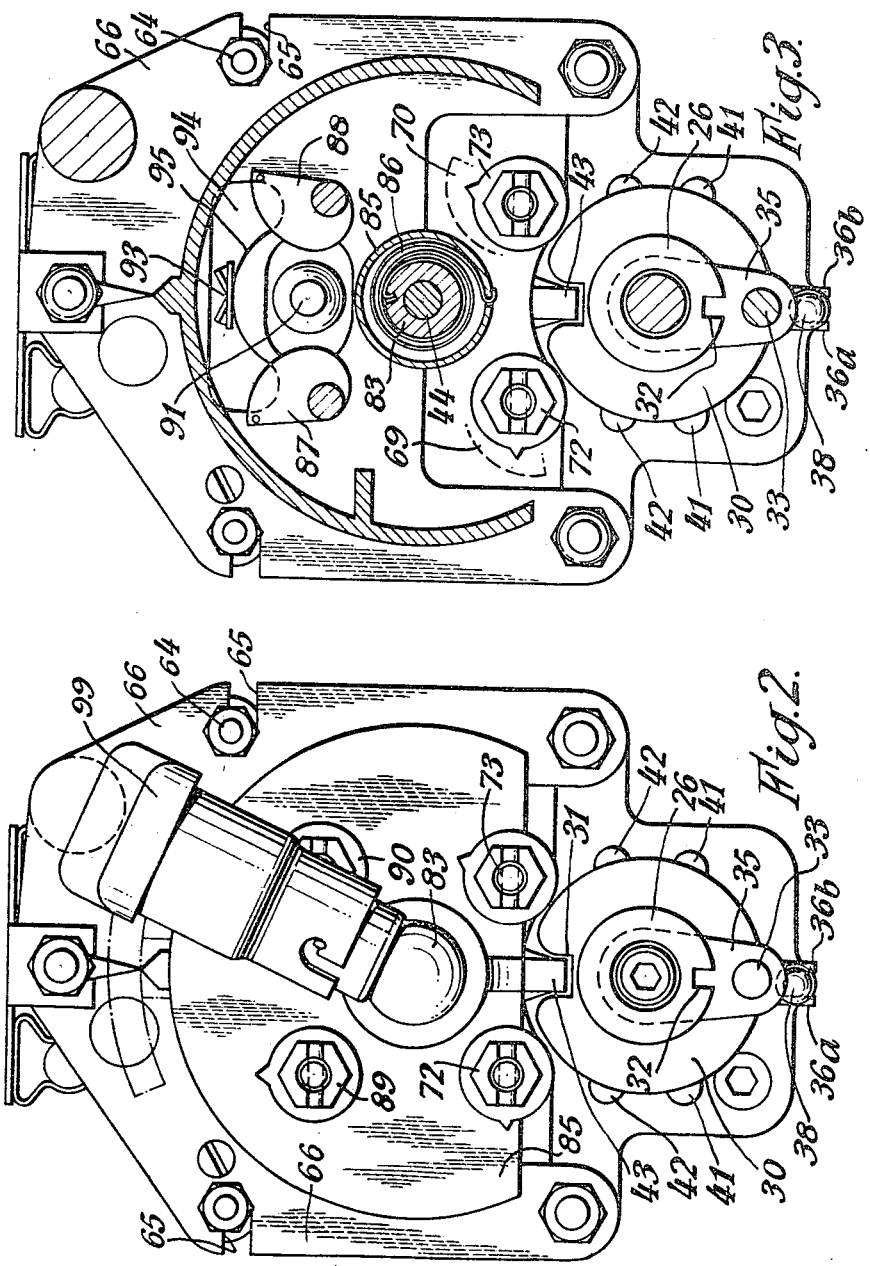

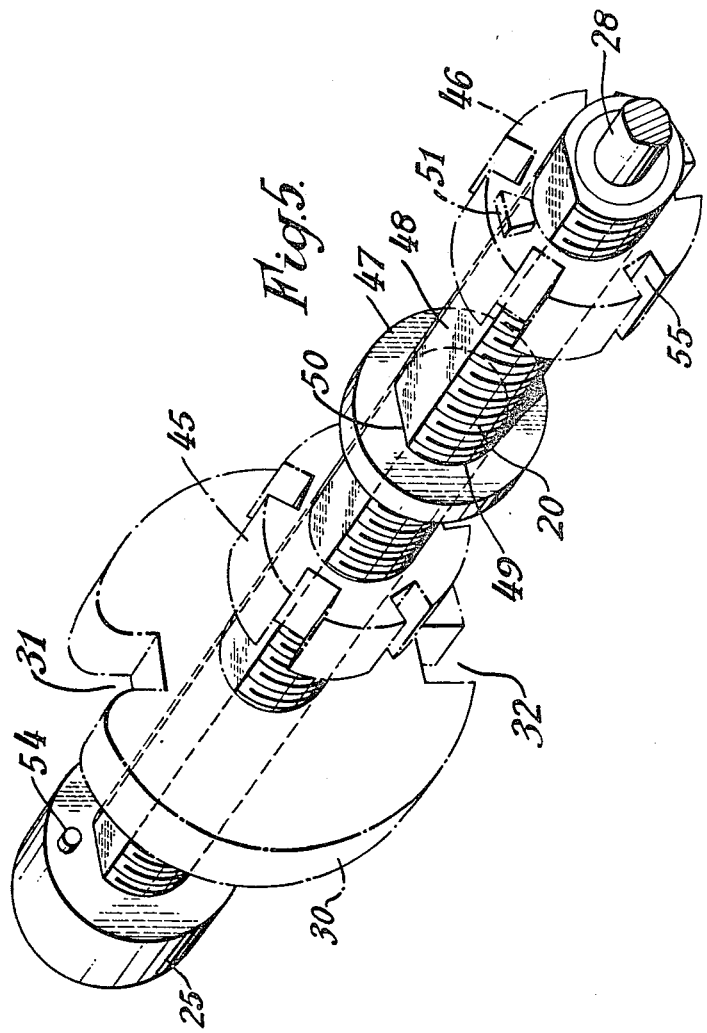

United States Patent Office 3,504,555
Patented Apr. 7, 1970

3,504,555
CONTROL UNITS MORE PARTICULARLY FOR
THE ELECTRICAL CIRCUITS OF VALVE
ACTUATORS
Jeremy J. Fry, Bath, England, assignor to Rotork Engineering Company Limited, Somerset, England
Filed Oct. 25, 1967, Ser. No. 677,943
Claims priority, application Great Britain, Dec. 15, 1966, 56,164/66
Int. Cl. F16h 25/24
U.S. Cl. 74—89.15                                10 Claims

ABSTRACT OF THE DISCLOSURE

An electrical control unit for a valve actuator includes a pair of switches which are actuated to de-energize the motor in accordance with the movement of the actuator output shaft to predetermined positions. The output shaft movement is transmitted to a rotatable, threaded shaft on which is mounted a travelling nut restrained against rotary movement until it reaches one or more limit positions determined by end stops at which time it pivots a switch actuating plate. One end stop is adjustable on the threaded shaft which is provided with a flat portion along its length. The adjustable stop comprises a locking washer which has a D-shaped aperture fitting the shaft and which is located between a pair of clamping nuts.

---

This invention relates to control units more particularly for valve actuators whereby ancillary circuits or operations are controlled by the movement of the actuator.

The present invention has particular use with actuators of the kind described in my U.S.A. patent specification No. 3,198,033, and which includes an output spindle or shaft which is capable of rotary movement to open or close the associated valve. The output shaft is selectively rotated by manual means or by a motor driven shaft or spindle operating through a worm and wormwheel. The motor spindle or shaft is mounted for limited axial movement in response to any undue increase in the torque required for moving the valve to the desired position.

The control unit of the present invention utilizes the rotary movement of the output shaft of the actuator to operate limit switches, for example for de-energizing the motor of the actuator when a predetermined position has been reached in either direction of movement.

According to the invention there is provided an electrical control unit for an actuator and more particularly for a valve actuator, said control unit having a switch or pair of switches forming part of an electrical control circuit for operating the actuator motor, and means responsive to the output movement of the actuator for operating the or each switch to de-energize the motor when the actuator reaches a predetermined position. The operating means comprises a threaded spindle which is rotatable in response to the output movement of the actuator and which is provided with a nut mounted thereon and normally restrained against rotation so as to travel axially along the spindle in one or other direction in accordance with the direction of rotation thereof. A pair of stop members is located one on each side of the travelling nut for engagement by the nut in its extreme position of movement along the threaded spindle whereby the nut is constrained to rotate with the spindle. The switch operating member is at all times in engagement with the nut during its axial travel along the spindle whereby the switch operating member is rotatable in one or other direction by the movement of the nut with the threaded spindle as it reaches one of its extreme positions of movement to actuate thereby the or one of said pair of switches.

At least one of the stop members is adjustable and in the preferred embodiment the other stop member is fixed and may comprise a flange at the end of the threaded spindle.

The adjustable stop member comprises a pair of lock nuts which are mounted on the spindle with a locking washer positioned therebetween. The locking washer is prevented from rotating relatively to the threaded spindle and in the preferred arrangement the threaded spindle is formed with a flat which extends along the whole length of the thread and the locking washer is provided with a D-shaped hole so as to fit on the threaded spindle with the flat of the hole located against the flat of the threaded spindle.

The construction of the adjustable stop member as provided by the invention ensures that any adjustment is positive and non-slipping. This is due to the fact that the locking washer cannot rotate relatively to the spindle and it is only necessary for finger tightening of the lock nuts against the washer to prevent loss of adjustment. The arrangement is simple and easily adjusted to position the stop member in a desired position on the spindle. The arrangement provides for consistent accurate operation of the switches when the output shaft of the actuator has reached a predetermined position.

In the preferred embodiment of the invention the threaded spindle is hollow and is mounted on a shaft which is rotatable in response to the output movement of the actuator. The shaft drives the hollow threaded spindle through a slipping clutch so that the stop members can be positioned to suit the limit positions of the valve. The clutch also acts as a safety device as it permits the shaft to rotate relatively to the spindle when the travelling nut reaches one of its extreme positions of movement until the actuator motor is de-energized.

The invention will now be described by way of example with reference to the accompanying drawings, in which:

FIGURE 1 is a longitudinal section through the control unit in accordance with the invention;

FIGURE 2 is a front view of the control unit of FIGURE 1;

FIGURE 3 is a sectional view taken on the line III—III of FIGURE 1;

FIGURE 4 is a detail end view of the adjustable stop member taken on the line IV—IV of FIGURE 1; and FIGURE 5 is a perspective view of the parts of the adjustable stop member on the threaded spindle.

The preferred embodiment of the invention as illustrated in the drawings is particularly applicable to valve actuators; for example the valve actuator as described in my U.S. patent specification No. 3,198,033. The valve actuator described in this patent specification includes a hand/auto arrangement and has a motor shaft or spindle which, by means of a worm and wormwheel, drives an output shaft which may be manually operated if desired.

The control unit is mounted in an auxiliary casing (not shown) but which includes a base plate or partition 10. The auxiliary casing of the control unit is connected with the main casing of the actuator which supports the motor shaft 11 on which is mounted a worm 12 engaging a wormwheel shown diagrammatically at 13 on the output shaft 14. The output shaft 14 is provided with a worm 15 meshing with a wormwheel 16 fixedly mounted by a pin 17 to a limit switch shaft 18 which extends through the base plate or partition 10 into the control unit housing. The limit switch shaft 18 is therefore rotatably driven in one or other direction in accordance with the rotational movement of the output shaft 14 and this movement of the limit shaft is utilized to operate one or more switches; for example limit switches controlling the electrical circuit for the actuator motor.

The limit switch shaft 18 is sealed within the base plate or partition 10 by two O-rings 19 and inside the control unit casing the shaft supports on its outer diameter a hollow threaded spindle 20.

The limit switch shaft 18 drives the hollow threaded spindle 20 through a clutch shown generally by the reference numeral 21 and which is mounted on the end of the spindle 20 adjacent the base plate or partition 10. The clutch 21 comprises a set of spring disc washers 22, which washers are located on the shaft 18 and positioned between a shoulder 23 on the shaft and the inner surface of a cup-shaped spacer member 24 which surrounds the spring disc washers 22. The spacer member 24 is engaged by a fixed flange 25 on the adjacent end of the hollow threaded spindle 20 and the spring disc washers 22 are pre-loaded by a clamping nut 26 and washer 27 which are located at the other end of the shaft. The washer 27 abuts the other end of the hollow threaded spindle 20 and the clamping nut 26 is threaded on a shaft 28 which extends from the end of the shaft 18 into which it is fitted for movement therewith, for example for operating a continuously movable indicator pointer (not shown). The adjustment of the clamping nut 26 on the shaft 28 engages the washer 27 against the end of the threaded spindle 20 so as to adjust the loading of the spring disc washers 22 which maintain the friction drive between the shaft 18 and the spindle 20.

A movable nut 30 is threadably mounted on the hollow spindle and is formed with axial slots 31, 32 in its periphery at diametrically opposed positions. The nut 30 is normally held against rotation with the threaded spindle 20 by a nut guide which comprises a rod 33 extending longitudinally with the spindle 20 but spaced therefrom. The rod 33 engages the slot 32 in the nut 30 and it is supported at its ends by plates 34, 35 loosely mounted respectively on the fixed flange 25 and the outer end of the spindle 20.

The nut guide is spring-loaded into a central position as shown in FIGURES 2 and 3 by a return spring 36 which is positioned around the cup-shaped spacer member 24. The ends 36a, 36b of the return spring 36 cross over each other just below the cup-shaped spacer member 24 and the ends are then located one on each side of an extension 37 of the rod 33 and a fixed retainer pin 38 mounted in the base plate or partition 10.

The nut 30 is therefore constrained to move axially along the hollow spindle 20 in one or other direction depending upon the output movement of the actuator to open or close the associated valve. In the leftward direction of movement, as viewed in FIGURE 1, the travelling nut 30 engages a fixed stop which comprises the fixed flange 25 on the threaded spindle 20, and in the rightward direction of movement it engages an adjustable stop 40 on the spindle 20 as will be hereinafter described. When the travelling nut 30 engages either one of the stop members it is forced to rotate with the hollow threaded spindle 20 and this rotational movement of the nut 30 is utilized to operate limit switches to de-energize the motor of the actuator. For example, the fixed stop member 25 may cause the nut 30 to rotate to de-energize the motor when the valve reaches its closed position, while the adjustable stop member 40 can be suitably positioned on the spindle 20 to rotate the nut 30 to de-energize the motor when the valve has moved to a predetermined open position. This movement of the valve to its open position, as determined by the number of turns of the threaded spindle, can be preset for the switch mechanism so that the control unit can be immediately applied to an actuator without any further adjustment.

Excess rotational movement of the nut 30 is prevented by the engagement of the projection 37 of the rod 33 of the nut guide with stops on the base plate or partition 10. Two sets of stops are provided for use depending on the speed of operation of the actuator. The first set of stops indicated by the references 41 is intended for low speed actuator operation while the second set of stops indicated by the references 42 are intended for high speed operation in which case the first stops 41 are tapped into the base plate 10 flush with the face so that the second stops 42 are used.

The lower edge of a longitudinally extending striker plate 43 engages the other peripheral slot 31 in the travelling nut 30. The striker plate 43 is pivotally mounted about a torque shaft 44 which is responsive as will be hereinafter described to axial movement of the motor shaft 11 of the actuator. The pivotal movement of the plate 43 by the nut 30 is utilized to actuate switches as will be hereinafter described.

The adjustable stop member 30 as shown more clearly in FIGURES 1, 4 and 5 comprises a pair of lock nuts 45 and 46 between which is positioned a locking washer 47. As shown in FIGURE 5 the threaded surface of the spindle 20 is provided with a flat 48 which extends the whole length of the thread on the spindle 20 so that the cross-sectional shape of the spindle is substantially D-shaped. The locking washer 47 is provided with a D-shaped aperture 49 which corresponds to the cross-sectional shape of the spindle so that the locking washer fits snugly thereon with the flat 50 of the washer fitting the flat 48 of the spindle. The arrangement is such that the washer 47 is adjustable slidably along the spindle 20 but is unable to rotate relatively thereto. The two lock nuts 45 and 46 are therefore tightened against the washer 47 in the desired limit position and the arrangement ensures that the adjustment is positive and non-slipping. No loss of adjustment can occur and it is only necessary to finger tighten the nuts 45 and 46 against the locking washer 47. The arrangement is not only simple but it provides for easy adjustment without the necessity of excessive tightening to prevent loss of adjustment during operation of the actuator. It will, however, be seen that the lock nuts are provided with axial grooves 55 in their periphery to enable the tightening of the nuts by tools if desired.

The construction of the adjustable stop member 40 is completed by a projection 51 on the outer surface of the lock nut 45. This projection is adapted to engage a corresponding projection 52 on the adjacent surface of the travelling nut 30 in one extreme limit position. The arrangement prevents any binding between the travelling nut 30 and the adjustable stop 40 which would probably occur if the projections were not provided. A similar projection 53 is provided on the other surface of the travelling nut 30 for engagement with a pin 54 mounted in the fixed flange 25 at the end of the spindle 20 in the other extreme limit position. The lock nuts 45 and 46 are, of course, interchangeable and therefore the lock nut 46 is also provided with a similar projection 51 on its outer surface.

The clutch 21 provides a safety device as the limit switch shaft 18 can continue to rotate relatively to the spindle 20 when the travelling nut 30 reaches one of its extreme positions of movement and until the motor is de-energized.

The clutch 21 also provides a self-setting device for the actuator whereby the adjustable stop member 40 may be positioned to suit the limit positions of the valves. For example, after the control unit has been mounted on the actuator, the motor is energized to drive the valve to its closed position and the motor is maintained in operation until the valve is closed irrespective of the engagement of the travelling nut with the fixed stop member i.e. the pin 54 on the fixed flange 25 of the threaded spindle 20, as the clutch 21 will permit relative rotational movement of the shaft 18 and spindle 20. At this time the valve closed position of the actuator is identified with the engagement of the travelling nut 30 with the pin 54 on the fixed flange 25 and the open position of the valve will be in accordance with the de-energization of the motor due to the engagement of the travelling nut 30 with the adjustable stop member 40 as described above. The adjustable stop member 40 can be easily and quickly positioned to predetermine the opening movement of the valve by the number of turns along the threaded spindle 20 from the fixed flange 25.

The particular embodiment of the control unit as shown in the drawings includes a number of switches which are arranged in two spaced banks for operation depending upon the direction of the movement of the actuator. In FIGURE 1 of the drawings one bank of switches is shown by the reference numerals 60, 61 and 62 and the mounting of the switches is designed so that they can be easily removed and exchanged by locating the heads of the mounting screws 43 in the base plate 10 and slotting a hexagonal nut 64 on the other end of each mounting screw 63 into a suitably shaped hole 65 in the electrical front plate 66.

In the preferred embodiment the front pair of switches 62 are particularly adapted for the control of the electrical circuit energizing the electrical motor of the actuator. The other pairs of switches 60 and 61 are utilized in the usual way for the control of ancillary circuits for other operations. The front pair of switches 62 may be selectively operated either as limit switches responsive to the output movement of the actuator or torque switches responsive to the output force of the actuator. Such an arrangement forms the subject matter of our copending British application No. 56,186/66 to which reference should be made for more detailed information but the arrangement will be hereinafter described briefly.

The pairs of switches 60 and 61 are operable by an auxiliary striker blade 65 which is also rotatable about the shaft 44 and which is resiliently attached to the auxiliary striker blade 43 by means of the spring connection 66. The spring 66 is located around the shaft 44 with its ends crossed and then located one on each side of the projection 67 of the auxiliary striker blade 65 and also the striker plate 43. This arrangement prevents any damage to the switches especially in actuators which operate at a high speed.

The front pair of switches 62 are selectively actuated by a switch striker plate 68 which is also rotatably mounted about the shaft 44 and which is located between the two switches for operating one or other switch in accordance with the actuator. The striker plate 43 is drivably connected with the switch striker plate 68 by means of a pair of cams 69, 70 shown in FIGURE 3 of the drawings and which are adjustably mounted on a flat extension 71 at the lower end of the switch striker plate 68. The cams are rotatable by knobs 72, 73 and the arrangement is such that the front end of the striker plate 43 will engage one or other of the cams 69, 70 as to rotate the switch striker plate 68 to operate one or other of the limit switches 62. It will be appreciated that by rotating the cams the operation of the limit switches may be set as desired and the cams are so designed as to provide for a position in which the switches 62 are completely inoperative by the movement of the striker plate 43. Another feature of this arrangement is that the requirement for the auxiliary switches 60, 61 to be operated slightly before the limit switches 62 is achieved and manufacturing tolerances on the switches which cause a variation in the tripping point are also overcome.

The limit switches 62 may also be operated in accordance with the output force or torque of the actuator and this arrangement also forms the subject matter of our copending British application No. 56,186/66.

Briefly, the torque shaft 75 is movable axially by the motor or worm shaft 12 and this torque shaft 75 pushes against a pin 76 which is carried in a helical slot 77 in the body of a torque switch actuator 78. The ends of the pin 76 are located in slots 79 in the base plate or partition 10 so that any axial movement of the pin caused by shaft 75 by reason of the helical slot 77 causes rotary movement of the torque switch actuator 78.

The shaft 44 is located in the torque switch actuator 78 and is pinned to it by the pin 80. The pin 80 also secures one end of a spring 81 the other end of which is located around a projection 82 of the base plate 10. The spring 81 preloads the torque shaft assembly of the shaft 44 and the adaptor 78 and thereby ensures that the assembly is always in contact with the torque shaft 75 so that any axial movement of the worm shaft in either direction causes relative rotary movement of the shaft 44. In other words if the shaft 75 moves axially to the left as shown in FIGURE 1 the shaft 44 will rotate due to the following movement of the adaptor 78 by reason of the preloading of the spring 81.

The front end of the shaft 44 carries a pointer plate 83 fixed to the shaft by a grub screw 84. Behind the pointer plate 83 there is a switch front plate 85 also located on shaft 44 and connected to the pointer plate 83 by a spring 86 which loads the pointer plate 83 against the front plate 85 by means of a lug on the face of one abutting a projection on the other (not shown).

The torque applied by the actuator is set by limiting the amount of rotary movement of the switch front plate 85 before it moves the switch striker plate 68 against the switches 62. This is achieved by mounting cams 87 and 88 on the back of the switch front plate 85. The cams are shown in FIGURE 3 and they are adjusted by knobs 89 and 90 on the front of the plate 85. The cams contact the projection 91 on the front of the switch striker plate 68 and thus when the shaft 44 rotates the pointer plate 83 and the switch front plate 85 also rotate so that one or other of the cams 87, 88 contacts the projection 91 on the switch striker plate 68 to move the plate to operate one of the switches 62. In this way the switches 62 operate also as torque switches and it will be appreciated that by suitably shaping the cams a position can be obtained whereby the cams 87 and 88 can be positioned so that the switches 62 are operated solely as limit switches.

In the operation of the control unit as described above in accordance with the output force of the actuator, difficulty sometimes occurs when the motor is de-energized; for example when the valve has reached its closed position. At this time it usually requires a greater torque to move the valve toward its open position particularly if the valve has remained closed for any length of time. In prior arrangements energization of the actuator in the open direction to try to open the valve has immediately caused an axial movement of the motor driven shaft 12 in the opposite direction due to the considerable increase in output force and this has resulted in the switch striker plate 68 pivoting across immediately to operate the other one of the pair of switches 62 thus de-energizing the actuator motor without effecting any opening movement of the valve.

The particular embodiment of the control unit as shown in the drawings avoids this difficulty by providing a latching arrangement which is more particularly described in our copending British application No. 56,137/66. Briefly, the latching arrangement comprises a latch spring 93 attached to the top of the auxiliary striker blade 65 and the front end of which projects into an opening 94 in the electrical front plate 66. The bottom surface of the opening 94 has a cam surface 95 as shown in FIGURE 3 so that in the central position of the auxiliary striker blade 65 the spring 93 is held upwardly by the cam surface 95 in a position as shown in FIGURE 1 away from the top surface of the switch striker plate 68. The latch spring is provided with a square hole 96 which is positioned above the switch striker plate 68 and the switch striker plate is provided with a pair of projections 97 on its upper surface which will in certain positions of the plate locate into the hole 96.

When the actuator, for example in closing the valve has stopped in the closing direction on torque setting, the striker plate 43, the switch stricker plate 68 and the auxiliary striker blade 65 have all moved to one side to operate the "close" switches. In so doing the latch spring 93 also moves sideways with the auxiliary striker blade 65 and due to the shape of the cam surface 95 the spring will now drop downwardly so as to engage its square hole 96 over a projection 97 on the top of the switch striker plate 68.

If now the actuator is operated for opening the valve the latch spring 93 by reason of its engagement with the projection 97 on the switch striker plate 68 prevents this plate from moving across to operate the opposite switch 62 until the actuator has unseated the valve and the limit switch drive through shaft 18 has begun to rotate thus moving the auxiliary switch blade 65 back to release the spring 93 which rides up the cam surface 95 and thus disengages from the switch striker plate 68.

The arrangement allows two or three turns of the actuator before release of the latch spring 93 which should be sufficient for the actuator to have successfully unstuck the valve so that the possibility of the opposite switch 62 being operated is eliminated.

The mechanism also carries a lamp 99 to illuminate the associated indicating mechanism and which can be easily moved aside to allow access to the adjusting knobs 72, 73, 89 and 90. A heater (not shown) may also be provided.

I claim:

1. In an electrical control unit for an actuator, more particularly for a valve actuator, said control unit having at least one switch forming part of an electrical control circuit, and means responsive to the output movement of the actuator for operating said at least one switch to de-energize the motor when the actuator reaches a predetermined position, said means comprising a threaded spindle rotatable in response to the output movement of said actuator, a nut mounted on said threaded spindle and normally restrained against rotation so as to travel axially along the spindle in one or the other direction in accordance with the direction of rotation thereof, a pair of stop members located one on each side of said travelling nut for engagement by said nut in its extreme positions of movement along said threaded spindle whereupon said nut is constrained to rotate with said spindle, and a switch operating member at all times in engagement with said nut during its axial movement along said threaded spindle, said switch operating member being rotatable in one or the other direction by the rotatable movement of said nut with the threaded spindle as it reaches one of its extreme positions of movement to actuate thereby said at least one switch, the improvement comprising means for adjusting one of said stop members, said adjustment means comprising a pair of lock nuts threadably mounted on said spindle, a locking washer positioned between said lock nuts and means for preventing said locking washer from rotating relative to said threaded spindle.

2. A control unit as claimed in claim 1 wherein the threaded spindle is formed with a flat which extends along the whole length of the threaded portion and the locking washer is provided with a D-shaped hole so as to fit slidably on the threaded spindle with the flat of the hole located against the flat of the threaded spindle.

3. A control unit as claimed in claim 1, wherein the threaded spindle has a fixed flange at one end forming one of said stop members.

4. A control unit as claimed in claim 1, in which the switch operating member comprises a plate engaging a notch in the periphery of the travelling nut.

5. A control unit as claimed in claim 4, wherein the switch operating plate operates one or more position limit switches.

6. A control unit as claimed in claim 1, wherein the travelling nut is normally restrained against angular rotation by means of a rod which extends parallel to the threaded spindle and which engages a notch in the periphery of the travelling nut.

7. A control unit as claimed in claim 6, wherein the rod is supported on the threaded spindle and has one end engageable with stop members for preventing excess rotational movement of the travelling nut in its extreme positions of movement along the threaded spindle.

8. A control unit as claimed in claim 1, wherein the threaded spindle is hollow and is mounted on a shaft rotatable in response to the output movement of the actuator, the hollow threaded spindle fitting said shaft to rotate therewith by means of friction, said friction drive providing a clutch permitting relative movement between the shaft and the hollow threaded spindle.

9. A control unit as claimed in claim 4, wherein the switch operating plate is formed in two parts resiliently connected together.

10. A control unit as claimed in claim 4, wherein the switch operating plate is formed in two parts drivably connected together through the intermediary of manually adjustable cams.

References Cited

UNITED STATES PATENTS

| | | | |
|---|---|---|---|
| 3,209,090 | 6/1965 | Fry | 200—47 |
| 2,614,672 | 10/1952 | Launder | 192—56 |
| 3,277,736 | 10/1966 | Goodman | 74—424.8 |

MARK NEWMAN, Primary Examiner

W. S. RATLIFF, Jr., Assistant Examiner

PO-1050
(5/69)

UNITED STATES PATENT OFFICE
CERTIFICATE OF CORRECTION

Patent No. 3,504,555     Dated April 7, 1970

Inventor(s) Jeremy J. FRY

It is certified that error appears in the above-identified patent and that said Letters Patent are hereby corrected as shown below:

Patentee Jeremy J. Fry, Bath England, assignor to

-- ROTORK CONTROLS LIMITED, -- Somerset, England.

SIGNED AND
SEALED
NOV 24 1970

(SEAL)
Attest:

Edward M. Fletcher, Jr.
Attesting Officer

WILLIAM E. SCHUYLER, JR.
Commissioner of Patents